Oct. 12, 1965    A. L. MILLER    3,211,373
WATER HEATING METHOD AND APPARATUS
Filed July 12, 1963    2 Sheets-Sheet 1
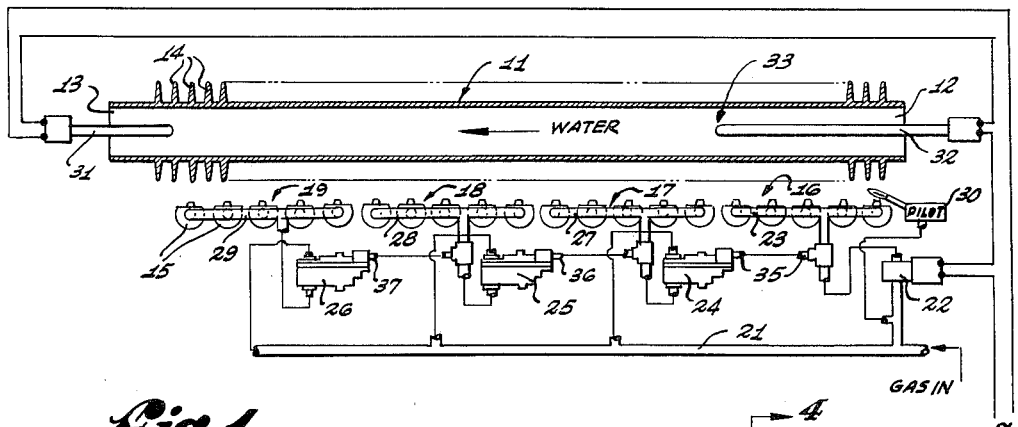
Fig. 1
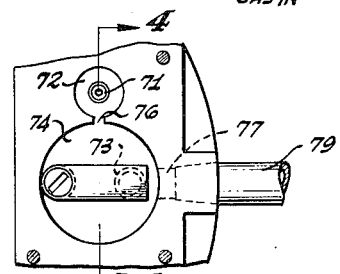
Fig. 3
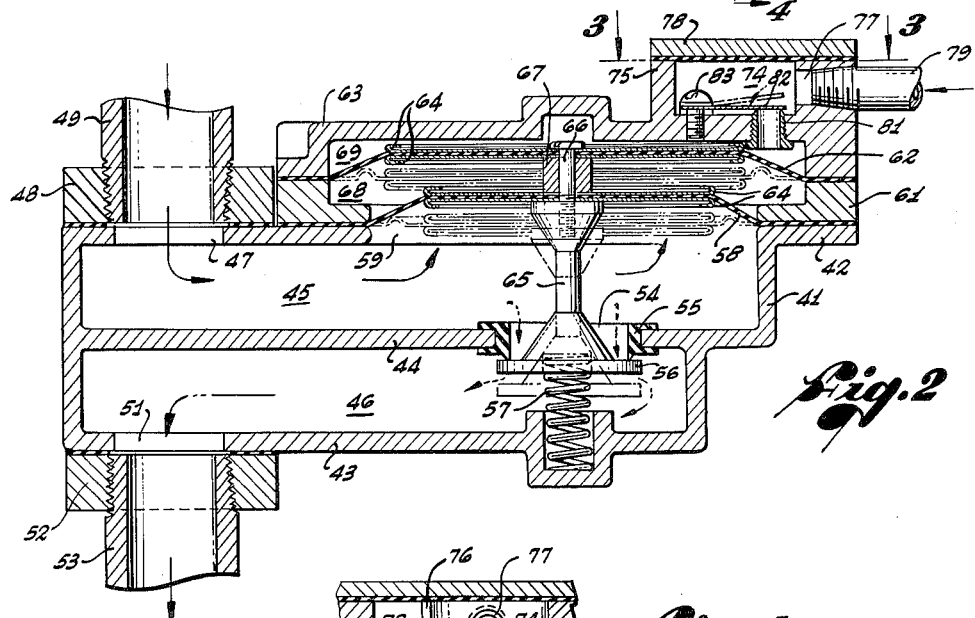
Fig. 2
Fig. 4
INVENTOR.
AVY L. MILLER
BY Fulwider, Patton, Rieber,
Lee, and Utecht
ATTORNEYS Oct. 12, 1965  A. L. MILLER  3,211,373
WATER HEATING METHOD AND APPARATUS
Filed July 12, 1963  2 Sheets-Sheet 2

INVENTOR.
AVY L. MILLER
BY Fulwider, Patton, Rieber,
Lee, and Utecht
ATTORNEYS

United States Patent Office 3,211,373
Patented Oct. 12, 1965

3,211,373
WATER HEATING METHOD AND APPARATUS
Avy L. Miller, 13246 Saticoy St., North Hollywood, Calif.
Filed July 12, 1963, Ser. No. 294,696
22 Claims. (Cl. 236—20)

The present invention is directed to a method and apparatus for heating water generally, and more particularly to the heating of water to be circulated through heat exchangers for space heating.

In the heating of circulating water for space heating, the heat input from combustion burners is conventionally established at a value to take care of the maximum heating requirements at maximum circulation and minimum temperature conditions. If the flow through the heater is not sufficiently great, the fast input of heat may cause the water in the heater to rise to steam forming temperature due to delay in the response of the thermostat controlling the supply of fuel to the burners. Thus, when the water reaches 180°, for example, at the thermostatic control, a cut-off of heat is indicated, but due to delay in the bulb response and mechanical delay, the thermostat may not operate quickly enough to prevent the water reaching steam forming temperature.

It is a primary object of the present invention to provide a method of operation and apparatus therefor which will take care of the sluggishness or delay in thermostat operation to prevent the water in a circulating water heater rising to steam forming temperature.

Another object of this invention is the provision of an improved method of operation and apparatus. therefor for a circulating water heater in which the heat input steam, regardless of flow of water through the heater.

Another object of this invention is the provision of an improved method of operation and apparatus therefor for a circulating water heater in which the heat input is applied in stages, with the initial stage such that even under a condition of no flow through the heater, the heat input will be cut off before a steam forming temperature occurs within the heater, and in which succeeding heating stages are added with a time delay in such manner that the controlling thermostat will operate after any stage, if satisfied, to cut off heat input before steam temperature occurs, under the existing conditions of water flow.

Still another object of this invention is the provision of an improved water heating method and apparatus sensing the water temperature at the heater outlet and dividing the combustion burners into separate sets, with the sets successively energized with a time delay therebetween and in a direction counter to the direction of water flow, and with each heating increment insufficient to raise the water to steam forming temperatures before the satisfied thermostat operates to cut off heat input.

A further object of this invention is the provision of an improved water heating control for a circulating heater, employing a pair of serially connected thermostats, one responsive to the outgoing water temperature and the other responsive to the water temperature at an intermediate point in the heater, and combustion burners for the heater operating progressively in individual stages in the same direction as the flow of water through the heater and with time delay between stages, and with the heating increments insufficient to raise the water to steam forming temperature before one of the thermostats is satisfied and operates to cut off the heat input.

A still further object of this invention is the provision of an improved water heater control employing a plurality of thermostats responsive to outgoing water temperatures and a plurality of sets of burners energizable in succeeding stages counter to the direction of flow of water through the heater, in which the ignition of succeeding sets of burners is effected with a time delay and concurrently with the shifting of the control to the next higher temperature satisfied thermostat.

Yet another object of the invention is the provision of an improved water heater control employing a plurality of thermostats responsive to outgoing water pressure and satisfied at different temperatures, and a plurality of sets of burners energizable in succeeding stages counter to the direction of flow of water through the heater, in which the control of the heat input is transferred from the lowest to the highest temperature satisfied thermostat with time delays therebetween after the ignition of the first set of burners, and in which the other sets of burners are ignited with successive time delays after control is transferred to the highest temperature satisfied thermostat.

The invention of the improved fluid control valve herein disclosed has been divided from this application and is described and claimed in my co-pending application Serial No. 350,172, filed March 9, 1964 for "Fluid Flow Control Valve."

These and other objects and features of the invention will be readily apparent to those skilled in the art from the following specification and the appended drawings, in which:

FIGURE 1 is a schematic representation of one embodiment of a circulating water heater and control therefor according to the present invention;

FIGURE 2 is a vertical sectional view through a fuel supply valve according to the present invention;

FIGURE 3 is a detailed sectional view on the line 3—3 of FIGURE 2;

FIGURE 4 is a detailed sectional view on the line 4—4 of FIGURE 3;

Figure 5:
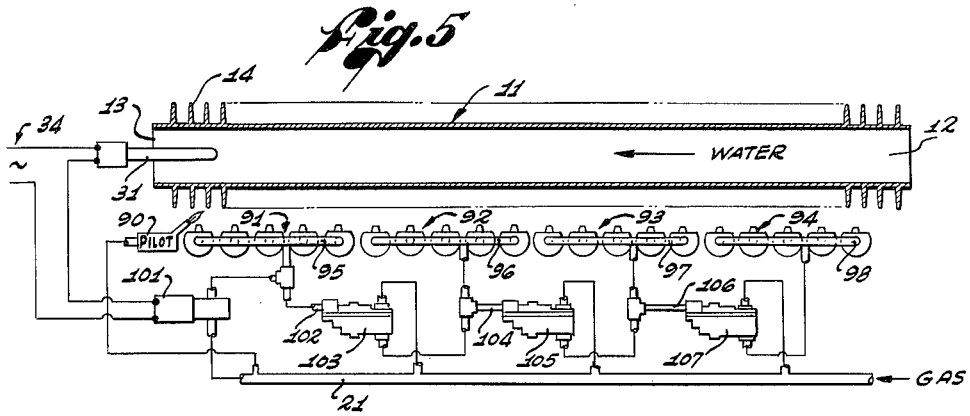
FIGURE 5 is a diagrammatic representation of another embodiment of the invention.

Referring first to the diagrammatic representation of the embodiment of FIGURE 1, a heat exchange tube is shown at 11 having an inlet at 12 and an outlet at 13, and provided on its outer surface with integral fins 14 about which pass the products of combustion from the burners 15 to the exhaust flue. Water is circulated through the tube 11 by conventional means such as a room thermostat controlled pump (not shown). The burners 15 are divided into a plurality of sets longitudinally of the tube 11, here shown as four in number and designated 16 through 19 in the order in which they are successively ignited to supply heat to the water within the heat exchange tube 11.

It will be understood that any desired combustion fuel may be consumed in the burners 15, gas being shown as illustrative only, and oil and other fuels being optional. The main fuel supply pipe is indicated at 21 and is connected by a solenoid valve 22 to a header 23 which feeds the burner set 16. The supply pipe 21 is also connected through time delay valves 24, 25 and 26 to headers 27, 28 and 29, respectively, which respectively feed the burner sets 17, 18 and 19. The valves 22, 24 and 25 also connect the supply line 21 to control pipes 35, 36 and 37, respectively, which respectively operate the valves 24, 25 and 26. A pilot 30 is constantly supplied from the line 21 and provides a constant ignition flame. The usual safety circuit (not shown) is associated with the pilot flame.

A first thermostat 31 having electrical contacts which are closed when the thermostat is not satisfied is set in the outlet 13 of the heat exchange tube 11 to be responsive to the temperature of water leaving the tube. A second thermostat 32 also having electrical contacts normally closed when the thermostat is not satisfied projects into the heat exchange tube 11 through the inlet 12 thereof to a point 33 which is just beyond the first burner set or stage 16 in the direction of water flow. The contacts of the thermostats 31 and 32 are connected in series through the solenoid of valve 22 to an electrical source 34.

In describing the operation of the embodiment of the present invention shown in FIGURE 1, the thermostat 31 will be assumed to be satisfied at a water temperature of 180°, and the thermostat 32 to be satisfied at a water temperature of 150°. Both thermostats must be unsatisfied for their contacts to be closed to energize the solenoid valve 22. Let us now assume a condition where the water at point 33 is below 150° and the water at the outlet 13 is below 180°. Both thermostats being now unsatisfied, their contacts are closed and a circuit is completed to the solenoid valve 22 which opens to supply fuel from the supply pipe 21 to the header 23 supplying the burner set 16 representing the first heating stage. The combustion fuel passing from the burners in set 16 is ignited from the pilot flame. The width of the initial heating stage provided by burner set 16 and the fuel flow thereto are selected so that even if there is no flow of water through the heat exchange tube 11, thermostat 32 will be satisfied to open its contacts, de-energize solenoid valve 22 and cut off supply of combustion fuel before the water being heated by the first burner stage can be raised to steam generating temperature.

This cut-off of heat input easily takes care of the sluggishness or delay in response of the thermostat 32 as there is a permissible over-run in the water temperature from 150° up to just below steam generating temperature. It will be understood, of course, that the greater the differential between the control temperature of the thermostat and steam generating temperature, the greater the sluggishness in thermostat action which can be tolerated for a given input of heat at the first stage or burner set 16. In the condition so far assumed where there is no or very little flow of water through the heat exchange tube, the raising of the temperature of the water at the point 33 to 150° will cut off the entire system and none of the succeeding heating stages provided by the burner sets 17–19 will be activated.

Let us now assume a condition where the flow of water through the tube 11 is sufficient so that the point 33 does not reach a temperature of 150°. With the opening of solenoid valve 22, the supply line 21 was connected not only to header 23, but also through a control pipe 35 to the control inlet of a time delay valve 24. If the thermostat 32 is not satisfied after the predetermined time delay provided in valve 24, valve 24 will open to connect the line 21 to the header 27 to supply combustion fuel to the burner set 17 which is now ignited to supply the second stage of heat input to the water passing through the heat exchange tube 11. Since the flow of water is assumed to be such that the thermostat 32 is not satisfied by the heat input from the first burner stage, the thermostat 32 remains unsatisfied and the control is now normally taken over by thermostat 31 which will cut off the heat input in the event the water leaving the heat exchange tube through the outlet 13 is at or above 180°. The heat input in the second stage at burner set 17 is selected so that with a flow of water through heat exchange tube 11 sufficient to keep thermostat 32 unsatisfied, the water in the tube 11 will never reach steam generating temperature before thermostat 31 is satisfied and operates to cut off the system with the minimum water flow satisfying the assumed condition.

Whe valve 24 opened, it connected the control inlet of time delay valve 25 to the supply line 21 through control pipe 36, and if thermostat 31 is not satisfied after the ignition of the burners in set 17 within the time delay period of valve 25, valve 25 opens to supply fuel to the header 28 and burner set 18 which now ignites to add a third heat input stage to the water flowing through the tube 11. Again, the heat input from the third stage burner set 18 is held insufficient, under the assumed condition where the flow of water is sufficient to maintain the water at point 33 below 150°, to raise the water to steam generating temperature before the thermostat 31 is satisfied at 180° and operates to cut off all ignited heating stages.

With the opening of valve 25, the control inlet of time delay valve 26 is connected to the supply line 21 through control pipe 37 and the valve 26 will open after its predetermined time delay after ignition of burner set 18, if the thermostat 31 has not in the meantime become satisfied. The opening of valve 26 connects the header 29 to the supply pipe 21 and the fourth stage burner set 19 ignites to complete full heat input into the heater.

At any time in the above sequence of operation that either of thermostats 31 or 32 becomes satisfied, either by the outlet water temperature reaching 180° or the water at point 33 reaching 150°, the corresponding contacts open to de-energize solenoid valve 22. This not only immediately cuts off the fuel to the first stage burner set 16, but also effectively connects control pipe 35 to atmosphere through the burners of set 16 to effect immediate closing of valve 24. This in turn effectively connects control pipe 36 to atmosphere through the burners of set 17 to close valve 25 which in turn leaves the control pipe 37 connected to atmosphere through the burners of set 18 to close valve 26. Thus, the satisfying of either thermostat, at any time in the sequence of ignition of the burner stages, effects cut-off of all the burners and returns the system to a condition of no heat input. Whenever both thermostats become unsatisfied thereafter, the system again starts up in the sequence previously given, with initial ignition of the first stage burner set 16 only, and ignition of additional burner stages in sequence, after predetermined time delays, only if both thermostats 31 and 32 remain unsatisfied.

It will be understood that the most critical condition for steam generation is when ignition is started and heat imparted to the water within the heat exchange tube while there is no flow of water through the tube. By having the low temperature thermostat 32 placed just beyond the first stage burner set 16, the maximum temperature differential is provided for this initial ignition and the danger of an over-run of the water to steam generating temperature because of sluggishness in the response of the thermostat is decreased.

It will be seen that in the system of FIGURE 1, even though the burners are divided up into separate sets to provide independent stages which are separately ignited, only a single pilot 30 and associated safety control need be provided for the entire heater. The burner sets are supplied with fuel in succession and no burner set can be so supplied unless the preceding set is being supplied. Therefore, if the initial stage burner set 16 is properly ignited, all the succeeding set or stages will ignite, as they become connected to the supply line, from the flames of the adjacent preceding burners.

FIGURES 2, 3 and 4 illustrate a form of time delay control valve according to the present invention which may be used for the valves 24, 25 and 26 in the embodiment of the invention shown in FIGURE 1, and in accordance with the method of operation previously described. This valve includes a main body portion 41 having an integral top plate 42 and bottom 43 and an integral intermediate wall 44 dividing the interior of the body portion 41 into an inlet chamber 45 and an outlet chamber 46. The top plate 42 has an inlet opening 47 therethrough about which is mounted a threaded socket flange 48 having an inlet pipe 49 threaded therein. The bottom 43 has an outlet opening 51 therethrough about which is mounted a threaded socket flange 52 having an outlet pipe 53 threaded therein. The intermediate plate 44 has an opening 54 therethrough in which is mounted a valve seat 55 normally closed by a valve plate 56 lightly biased into upward, closed position by a compression spring 57.

A first control diaphragm 58 is mounted on the top face of the top plate 42 about an opening 59 therethrough by means of a spacing ring 61. A second control diaphragm 62 is mounted on the upper face of the spacing ring 61 by a valve cover plate 63, the control diaphragms 68 and 62 being thereby mounted in spaced relation. The central portions of the diaphragms 58 and 62 are conventionally stiffened by opposed discs 64. The valve plate 56 has an integral, generally spool-shaped stem 65 extending upwardly therefrom and the diaphragms 58 and 62 and their stiffening discs 64 are rigidly secured to the stem 65 by a stud 66 and a spacer tube 67 between the diaphragms. The valve plate 56 and diaphragms 58 and 62 thereby move together as a unit. The chamber 68 between the diaphragms 58 and 62 may be connected to atmosphere as it performs no function in the operation of the valve.

The chamber 69 between the diaphragm 62 and the valve cover 63 is connected by a first opening 71 with a chamber 72 and by a second opening 73 with a chamber 74, the chambers 72 and 74 being disposed in a boss 75 extending upwardly from the top cover 63. The chambers 72 and 74 are connected by a passage 76 and a control inlet 77 leads into the chamber 74. The chambers 72 and 74 are sealably closed by a top plate 78 on the boss 75 and a control pipe 79 threads into the control inlet 77.

A flat valve seat 81 is threaded into the opening 73 and a flap valve 82, of neoprene or similar flexible material, is mounted in the chamber 74 by a stud 83 at one end and has its other end abutting the end of the valve seat 81 in sealable relation. A readily replaceable member 84 is pressed into the opening 71 and has an orifice 85 therethrough to restrict the flow of fluid from the chamber 72 into the chamber 69. The restricted orifice 85 provides a time delay between the application of control pressure at the inlet 77 and the opening of the valve.

The operation of the valve of FIGURES 2–4 is as follows: The valve is shown in full lines in FIGURE 2 in the closed position in which the valve plate 56 is held against valve seat 55 by the light biasing spring 57 (sufficient only to oppose gravity opening of the parts) and by the fluid supply pressure within chamber 45 acting on the under surface of the diaphragm 58. In the unoperated condition there is no control pressure in the control pipe 79 and the pressure within chamber 69 is atmospheric. The effective area of the diaphragm 62 is greater than the effective area of the diaphragm 58. Upon the application of control pressure, such as the fluid supply pressure, at the control pipe 79, the incoming control fluid passes through inlet 77 into chamber 74, but is prevented from passing through the opening 73 by the closed flap valve 82. Fluid then passes through passageway 76 into chamber 72 where it passes through the restricted orifice 85 into the chamber 69. After a time delay determined by the size of the orifice 85, the pressure within chamber 69 becomes sufficiently great so that the force exerted on the large upper diaphragm 62 overcomes the combined force exerted on the lower diaphragm 58 and the bias of spring 57 to move the valve plate 56 downwardly to open passage 54 and provide for flow of fluid through the valve from inlet 49 and chamber 45 through the passage 54 to chamber 46 and outlet pipe 53. As soon as the valve plate 56 starts to uncover the opening 54, the pressure within chamber 45 drops very rapidly to decrease the upward force on diaphragm 58 so that the valve makes a full opening movement to its broken line position, as soon as the pressure in the chamber 69 exerts sufficient force to initiate valve opening movement.

When the control pressure at the pipe 79 is cut off and returned to atmospheric pressure, the fluid within the chamber 69 is rapidly vented through opening 73 past the flap valve 82, which is moved into open, dotted-line position, and thence back out through the control pipe 79. This return fluid movement occurs without a time delay so that the valve moves immediately to closed position under the combination of what force is exerted on the under surface of the diaphragm 58 and the bias of spring 57, as soon as the control pipe 79 is opened.

The time delay provided in the valve may be readily varied by interchanging the member 84 with like members having different size orifices 85. Or the delay may be removed entirely and the valve function as a simple, immediate-responsive control valve by removing the member 84 or the flap valve 82, or both.

In the embodiment of this invention shown in FIGURE 1, and specifically described, the opening of each preceding valve passes full supply line pressure to the control pipes 35, 36 and 37 of the time delay valves which correspond to the control pipe 79 of the valve of FIGURES 2–4. Upon de-energization, as each preceding valve closes, its outlet pipe 53 becomes connected to atmosphere through the burners which it controls, and accordingly the succeeding control pipe 79 likewise becomes connected to atmosphere and permits immediate closing of the valve it controls.

Referring now to the embodiment of the invention schematically illustrated in FIGURE 5, the heat exchange tube 11 has an inlet 12, outlet 13 and exterior fins 14, as before, but the thermostat 31 in the outlet of the heat exchange tube is now the sole controlling thermostat, the thermostat 32 being omitted in this embodiment. The burner stages for supplying heat to the water passing through the heat exchange tube are here designated 91 through 94 and are successively ignited in ascending order, that is, now counter to the direction of flow of water through the heat exchange tube. The burner stages 91 through 94 are fed from fuel supply headers 95 through 98, respectively. A pilot 90 which burns continuously to effect ignition of the first burner stage 91 and the usual safety devices (not shown) are provided. The fuel supply line is again indicated at 21 and the contacts of thermostat 31 are connected in series with a solenoid valve 101 to an electrical source 34. The solenoid valve 101 opens to connect the fuel supply line 21 to the header 95 and to the control pipe 102 of the time delay valve 103. The valve 103 connects the fuel supply line to the header 96 and to the control pipe 104 of a time delay valve 105. The valve 105 connects supply line 21 to the header 97 and to the control pipe 106 of a time delay valve 107 which opens to connect the supply line 21 to the header 98.

The operation of the embodiment of the invention illustrated in FIGURE 5 is as follows: Assume, as before, that the thermostat 31 is set to be satisfied at a water outlet temperature of 180° and that it operates to open its contacts when satisfied. If the water leaving the heat exchange tube 11 is below 180°, the thermostat 31 will call for heat by closing its contacts to open solenoid valve 101 and supply fuel to the header 95. The first burner stage 91 now ignites to supply heat to the water adjacent the outlet of the tube 11. In the event there is little or no flow of water through the tube 11, the temperature of the water above the burner set 91 will be quickly raised, and when it reaches 180°, the thermostat 31 will be satisfied and will start to open. Due to the inherent delay and sluggishness in the thermostat 31 there will be some temperature over-run, but the heat input from the first burner stage 91 is set to permit the thermostat to operate to close the valve 101 before the water in the tube 11 above the burner set 91 can reach steam generating temperature, even under the worst condition of no flow at all through the tube 11.

When the solenoid valve 101 opened, it initiated the time delay for opening of time delay valve 103 by connecting the control pipe 102 to the supply line. Under the condition of little or no flow of water through the tube 11, the thermostat 31 will be satisfied and will open its contact to de-energize solenoid valve 101 before valve 103 can open. Therefore in this condition, only the first burner stage 91 is ignited and the water in the tube 11 is prevented from reaching steam generating temperature.

Assume now a condition in which there is sufficient flow through the tube 11 to prevent the thermostat 31 being satisfied by the heat imparted to the water by the first burner stage 91. After the time delay determined by the restricted orifice of the valve 103, it will open to connect header 96 to the supply 21 and the second burner stage 92 will become ignited to pass additional heat to the water flowing through the tube 11. If, after the time delay provided by the restricted orifice of valve 105, the thermostat 31 is still unsatisfied, valve 105 opens to connect header 97 to the supply line 21 and the third burner stage 93 ignites to pass still additional heat into the water passing through the tube 11. If the flow of water through the tube 11 is sufficient so that still more heat input is called for, the valve 107 opens after the predetermined time delay provided by its restricted orifice, and the header 98 is connected to the supply line 21 to ignite the last burner stage 94, whereupon maximum heat will be supplied to the water passing through the heat exchange tube 11.

At any time during this successive opening of the time delay valves 103, 105 and 107 that the thermostat 31 is satisfied, its contacts will open to close the thermostatic valve 101, whereupon each of the time delay valves 103, 105, 107 will quickly close as their control pipes 102, 104, 106 are connected to atmosphere through the burners of the preceding stage. When the thermostat 31 is so satisfied, the system preferably returns to its initial condition of no heat input with all burner stages off. If the thermostat becomes unsatisfied thereafter, the burner stages are ignited as described, in succession, with the burner stage 91 igniting immediately the thermostat 31 calls for heat, and the other burner stages igniting in succession with successive time delays in the event the thermostat is not satisfied. The amount of heat which is added by each burned stage 92–94 is set sufficiently low so that if the thermostat 31 is satisfied by the additional increment fo heat provided by the burner stage under consideration, the lag in thermostat operation will not be sufficient to cause the water in the heat exchange tube to rise to steam generating temperature.

Figure 6:
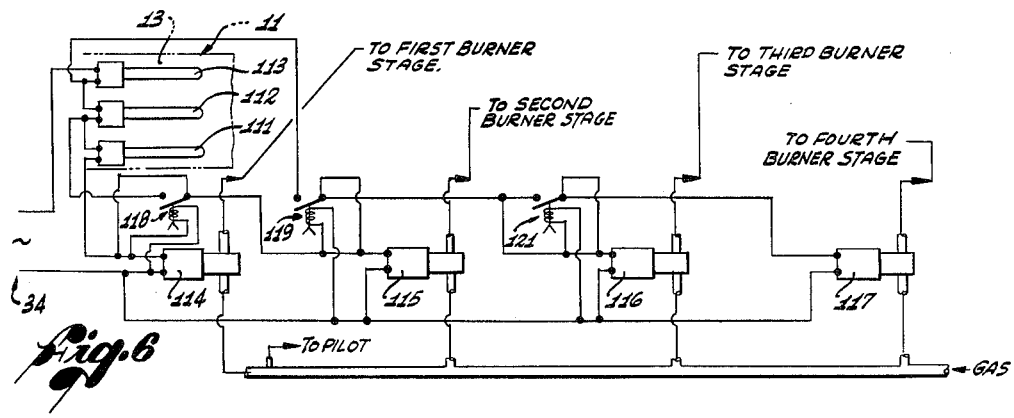
FIGURE 6 is a diagrammatic representation of a still further embodiment of the invention.

Referring now ot the embodiment of the invention schematically illustrated in FIGURE 6, the heat exchange tube 11 and the burner stages 91–94 and their supply headers 95 through 98 are the same as illustrated in the embodiments of FIGURE 5 and are not here repeated. In the outlet end 13 of the heat exchange tube 11 are now placed a plurality of control thermostats, here illustrated as three at 111, 112 and 113, set to be satisfied at different temperatures. The header 95 is controlled by a solenoid valve 114, the header 96 is controlled by a solenoid valve 115, the header 97 is controlled by a solenoid valve 116, and the header 98 is controlled by a solenoid valve 117. The contacts of the thermostats 111, 112 and 113 are connected in series with the solenoid of the valve 114 to an electrical source 34. The operating coil of a first time delay relay 118 is connected across the solenoid of the valve 114. The operating coil of a second time delay relay 119 is connected across the solenoid of the valve 115, and the operating coil of a third time delay relay 121 is connected across the solenoid of the valve 116. The contacts of the relay 118 are connected to by-pass the contacts of thermostat 111 and to energize the solenoid valve 115. The contacts of relay 119 are connected to by-pass the contacts of thermostat 112, and to energize the solenoid valve 116. The contacts of relay 121 are connected to energize the solenoid valve 117.

The operation of the embodiment of the invention illustrated in FIGURE 6 is as follows: The thermostats 111, 112 and 113 are set to be satisfied at different control temperatures; for example, thermostat 111 at 150°, 112 at 170°, and 113 at 180°. To start up the burner stages after a shut down, the water temperature at the outlet 13 must be below 150° so that all the termostats are unsatisfied and their contacts closed. This effects energization of the first solenoid valve 114 to connect the header 95 to the supply line 21 to ignite the first burner stage 91. If the heat supplied by the first burner stage 91 raises the temperature of the water at the outlet to 150° within the time delay of relay 118, as may occur if there is little or no flow of water through the heat exchange tube 11, the thermostat 111 becomes satisfied and its contacts open to de-energize the solenoid valve 114 and stop heat input. The supply of heat from the initial burner stage 91 is selected so that even with no flow through the heat exchange tube 11, the thermostat 111 will have time to operate before the heat input can raise the below-150°-temperature water to steam generating temperature.

Assuming there is some flow of water through the tube 11, the thermostat 111 will not be satisfied by the heat injected into the water from the first burner stage 91, and the burner stage 91 will continue until the time delay of the relay 118 expires and its contacts close. This energizes the second solenoid valve 115 to ignite the second burner stage, and at the same time by-passes the thermostat 111 so the control of the system is now placed in thermostat 112 which is satisfied at 170°. The operating coil of time delay relay 119 is energized at the same time the solenoid of valve 115 is energized. If the combined heat inputs of the first two burner stages are sufficient to raise the temperature of the water at the outlet 13 to 170° within the time delay period of the relay 119, the contacts of thermostat 112 open to de-energize the system and cut off the burners. If the combined heat inputs of the first two burner stages are insufficient to raise the outgoing water to 170° within the time delay period of relay 119, the relay contacts close to by-pass the thermostat 112 and place the control of the system in the thermostat 113 with its setting of 180°. At the same time, the contacts of relay 119 energize both the solenoid valve 116 to ignite the third burner stage and the operating coil of time delay relay 121. If the temperature of the outgoing water does not reach 180° within the time delay period of the relay 121, its contacts close to energize the solenoid valve 117 to ignite the fourth burner stage with the heater then operating at maximum input passing through the tube 11.

If and when the water at the outlet 13 reaches 180°, the thermostat 113 will be satisfied to open the circuit and de-energize all of the solenoid valves to return the system to its no heat input condition. Inasmuch as the solenoid valves 114–117 operate independently, that is, a succeeding valve may be opened if a preceding valve for some reason remains closed, it is preferable to have individual pilots and safety controls for each of the stages of burners in the embodiment of FIGURE 6.

Figure 7:
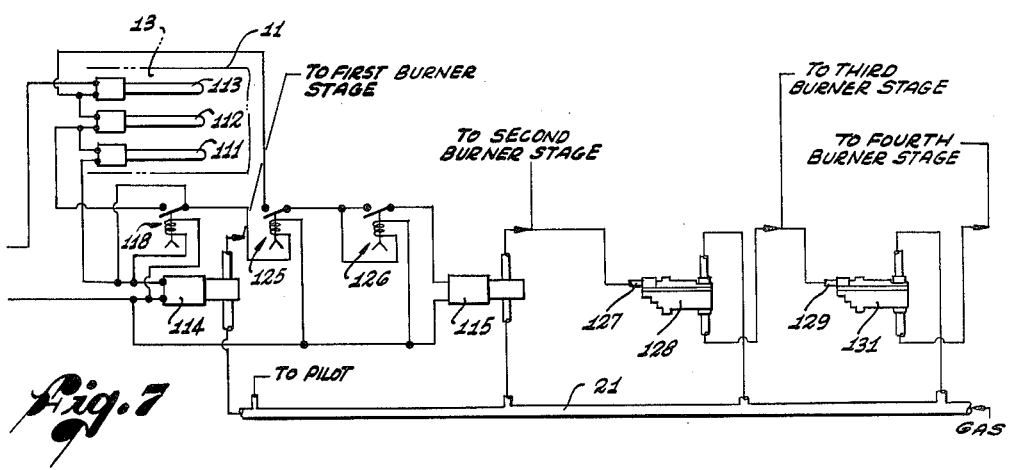
FIGURE 7 is a diagrammatic representation of yet another embodiment of the invention.

Referring now to the embodiment of the invention schematically illustrated in FIGURE 7, the same three thermostats 111, 112 and 113, are employed as in the embodiment of FIGURE 6 and the same solenoid valves 114, 115 controlling the headers 95 and 96 for the first and second burner stages. The operating coil of the time delay relay 118 is again connected across the solenoid of valve 114 and its contacts by-pass the thermostat 111, but energize only the operating coil of a time delay relay 125. The contacts of time delay relay 125 by-pass the thermostat 112, but energize only the operating coil of a time delay relay 126. The contacts of time delay relay 126 control the energization of the solenoid valve 115 for the second burner stage, and the solenoid valve 115 also connects the control pipe 127 of a time delay valve 128 to the supply line 21. The valve 128 controls the connection of the third burner stage to the supply line 21 and also connects the supply line to the control pipe 129 of a time delay valve 131 which controls the connection of the supply line to the fourth burner stage.

The operation of the embodiment of the invention of FIGURE 7 is as follows: The thermostats 111, 112 and 113 may be set as before to be satisfied at 150°, 170° and 180°, respectively. Upon the water at the outlet 13 of the heat exchange tube 11 falling below 150°, all three thermostats will be unsatisfied and their contacts close to energize the solenoid valve 114 and the operating coil of the time delay relay 118. The first burner stage is now connected to the supply line 21 and ignites to supply heat to the water adjacent the outlet of heat exchange tube 11. If there is no flow through the tube, the water temperature may increase to 150° during the time delay of relay 118 to satisfy the thermostat 111 which will therefore open to deenergize solenoid valve 114 and shut off the supply of heat. On the other hand, if there is some flow through the heat exchange tube 11, the supply of gas to the first burner stage will continue throughout the delay period of the relay 118 whose contacts will then close to short out the thermostat 111 and energize the operating coil of the time delay relay 125. If the water at the outlet 13 should reach 170° during the next time delay period, the system will shut off as before. If the water does not reach 170° during the delay period of the relay 125, it will close and its contacts will by-pass the thermostat 112 and place the control of the system in the 180° thermostat 113. At any time thereafter that the water in the outlet 13 reaches 180°, the thermostat 113 will be satisfied to shut off the system and return the valves to the closed position to shut off the burners.

If the water at the outlet 13 does not reach 180° within the time delay of the relay 126, its contacts will close to energize the solenoid 115 and the second burner set will be connected to the supply line 21 and ignited. Opening of the solenoid valve 115 connects the supply line 21 to the control pipe 127 of the time delay valve 128 which may be of the type illustrated in FIGURES 2–4. After a time delay determined by the restricted orifice of valve 128, it will open to effect ignition of the third burner stage. When the valve 128 opens, it also connects the line 21 to the control pipe 129 of the time delay valve 131 which, if the water at outlet 13 does not reach 180° within its time delay period, will thereafter open to ignite the fourth burner stage.

Therefore, in the embodiment of FIGURE 7, the thermostats 111, 112 and 113 are successively given control of the system in responding to the temperature of the water at the outlet 13 while the first burner stage only is ignited, and the other burner stages are not ignited until the system is under the control of the highest temperature responsive thermostat 113. The system control changes from the lowest temperature control after a predetermined time delay to the next higher control, and after another predetermined time delay, to the highest temperature control, all with only the first burner stage ignited. Thereafter, the successive burner stages are ignited with time delays therebetween to permit operation of the thermostat, if satisfied, to cut off heat input before the water can rise to steam generating temperature.

While certain preferred embodiments of the invention have been specifically illustrated and described, it will be understood that the invention is not limited thereto as many variations in the method of operation and the apparatus of this invention will be apparent to those skilled in the art, and the invention is to be given its broadest interpretation within the terms of the following claims.

I claim:

1. The method of heating water in a circulating heater which comprises: separating the combustion burners in the heater into a plurality of stages spaced along the length of the heater so as to supply heat to the same circulating water in succession; sensing the temperature of the water in the heater outlet; sensing the temperature of the water in the heater at the downstream edge of the first burner stage adjacent the water inlet to the heater; igniting only said first brrner stage when the temperatures at the sensing points are below predetermined values; and cutting off said first burner stage if the water at the downstream edge thereof reaches a predetermined value.

2. The method of heating water in a circulating heater which comprises: separating the combustion burners in the heater into a plurality of stages spaced along the length of the heat exchange elements of the heater so as to supply heat to the same circulating water in succession; sensing the temperature of the water at the heater outlet; sensing the temperature of the water in the heater at the downstream edge of the first burner stage adjacent the water inlet to the heater; igniting only said first burner stage when the temperatures at the sensing points are below predetermined values; and cutting off said first burner stage without igniting additional burner stages, if the water at the downstream edge of said first stage reaches a predetermined value within a predetermined time.

3. The method of heating water in a circulating heater which comprises: separating the combustion burners in the heater into a plurality of stages spaced along the length of the heat exchange elements of the heater so as to supply heat to the same circulating water in succession; sensing the temperature of the water at the heater outlet; sensing the temperature of the water in the heater at the downstream edge of the first burner stage adjacent the water inlet to the heater; igniting only said first burner stage when the temperatures at the sensing points are below predetermined values; igniting a second burner stage downstream of said first burner stage if the water at the sensing point at the downstream edge of the first burner stage does not reach a predetermined value within a predetermined time; and cutting off both said burner stages if the water at either sensing point reaches the predetermined values established for the points at any time.

4. The method of heating water in a circulating heater which comprises: separating the combustion burners in the heater into a plurality of stages spaced along the length of the heat exchange elements of the heater so as to supply heat to the same circulating water in succession; sensing the temperature of the water at the heater outlet; sensing the temperature of the water in the heater at the downstream edge of the first burner stage adjacent the water inlet to the heater; igniting only said first burner stage when the temperatures at the sensing points are below predetermined values; igniting a second burner stage downstream of said first burner stage if the water at the sensing point at the downstream edge of the first burner stage does not reach its predetermined value within a predetermined time; and igniting additional burner stages in sequence and each after a predetermined time delay after ignition of the preceding burner stage if the water at neither of said sensing points reaches their predetermined values within the time delay periods provided.

5. The method of heating water in a circulating heater which comprises: separating the combustion burners in the heater into a plurality of stages spaced along the length of the heat exchange elements of the heater so as to supply heat to the same circulating water in succession; sensing the temperature of the water at the heater outlet; sensing the temperature of the water in the heater at the downstream edge of the first burner stage adjacent the water inlet to the heater; igniting only said first burner stage when the temperatures at the sensing points are below predetermined values; igniting a second burner stage downstream of said first burner stage if the water at the sensing point at the downstream edge of the first burner stage does not reach its predetermined value within a predetermined time; igniting additional burner stages in sequence and each after a predetermined time delay after ignition of the preceding burner stage if the water at neither of said sensing points reaches their predetermined values within the time delay periods provided; and cutting off all of the ignited burner stages at any time the water temperature at either of the sensing points reaches the predetermined value established therefor.

6. The method of heating water in a circulating water heater which comprises: separating the combustion burners in the heater into a plurality of stages spaced along the length of the heat exchange elements of the heater so as to supply heat to the same circulating water in succession; sensing the temperature of the water adjacent to the heater outlet and without admixture with water outside the heater; igniting only the first burner stage adjacent to the heater outlet when the water at the sensing point falls below a predetermined value; igniting the next burner stage fi the water at the sensing point does not rise to said predetermined value within a predetermined time interval; and cutting off any ignited burner stages whenever the water at said sensing point rises to said predetermined temperature.

7. The method of heating water in a circulating water heater which comprises: separating the combustion burners in the heater into a plurality of stages spaced along the length of the heat exchange elements of the heater so as to supply heat to the same circulating water in succession; sensing the temperature of the water adjacent to the heater outlet and without admixture with water outside the heater; igniting only the first burner stage adjacent the heater outlet when the water temperature at the sensing point falls below a predetermined value; and cutting off said first burner stage without igniting additional burner stages if the water at said sensing point rises to said predetermined value within a predetermined time.

8. The method of heating water in a circulating water heater which comprises: separating the combustion burners in the heater into a plurality of stages spaced along the length of the heat exchange elements of the heater so as to supply heat to the same circulating water in succession; sensing the temperature of the water adjacent to the heater outlet; igniting only the first burner stage adjacent the heater outlet when the water temperature at the sensing point falls below a predetermined value; igniting additional burner stages until the water at said sensing point reaches said predetermined value, but delaying the ignition of each stage until a predetermined time interval after the ignition of the preceding burner stage to permit the effect of the heat input from each burner stage to be carried to the sensing point before the ignition of the next succeeding stage; and cutting off all ignited burner stages whenever the water temperature at said sensing point rises to said predetermined value.

9. The method of heating water in a circulating water heater which comprises: separating the combustion burners in the heater into a plurality of stages spaced along the length of the heat exchange elements of the heater so as to supply heat to the same circulating water in succession; sensing the temperature of the water adjacent to the heater outlet; igniting the first burner stage adjacent to the heater outlet when the temperature at the sensing point falls below a predetermined value; igniting the next adjacent burner stage if the temperature of the water at the sensing point does not rise to said predetermined value within a predetermined time interval; maintaining said two burner stages ignited unless the temperature of the water at said sensing point reaches a second and higher predetermined value within a second predetermined period; igniting a third burner stage after said second predetermined period; and maintaining said three burner stages ignited unless the temperature of the water at said sensing point reaches a third and still higher predetermined temperature.

10. The method of heating water in a circulating heater which comprises: separating the combustion burners in the heater into a plurality of stages spaced along the length of the heat exchange elements of the heater so as to supply heat to the same circulating water in succession; sensing the temperature of the water adjacent to the heater outlet; igniting the first burner stage adjacent to the heater outlet when the temperature at the sensing point falls below a predetermined value; igniting the next burner stage if the temperature of the water at the sensing point does not rise to said predetermined value within a predetermined time interval; maintaining said two burner stages ignited unless the temperature of the water at said sensing points reaches a second and higher predetermined value within a second predetermined period; igniting a third burner stage after said second predetermined period; maintaining said three burner stages ignited unless the temperature of the water at said sensing point reaches a third and still higher predetermined temperature; igniting a fourth burner stage a predetermined time interval after the ignition of said third burner stage; and cutting off all ignited burner stages at any time that the water at the sensing point reaches the predetermined temperature controlling at any given instant of time.

11. The method of heating water in a circulating heater which comprises: separating the combustion burners in the heater into a plurality of stages spaced along the length of the heat exchange elements of the heater so as to supply heat to the same circulating water in succession; sensing the temperature of the water adjacent to the heater outlet; igniting the first burner stage adjacent to the heater outlet when the temperature of the water at the sensing point falls below a predetermined value; maintaining said first burner stage ignited unless the temperature of the water at said sensing point reaches said predetermined value within a predetermined time; continuing to maintain said first burner stage ignited unless the water at said sensing point reaches a second and higher predetermined temperature within a second predetermined period of time; maintaining said first burner stage ignited unless the temperature of the water at said sensing point reaches a third and still higher predetermined temperature within a third period of time; and igniting another burner stage after the expiration of said third time period unless the water at said sensing point has reached said third predetermined temperature within said third time period.

12. The method of heating water in a circulating heater which comprises: separating the combustion burners in the heater into a plurality of stages spaced along the length of the heat exchange elements of the heater so as to supply heat to the same circulating water in succession; sensing the temperature of the water adjacent to the heater outlet; igniting the first burner stage adjacent to the heater outlet when the temperature at the sensing point falls below a predetermined value; maintaining said first burner stage ignited unless the temperature of the water at said sensing point reaches said predetermined value within a predetermined time; continuing to maintain said first burner stage ignited unless the water at said sensing point reaches a second and higher predetermined temperature within a second predetermined period of time; maintaining said first burner stage ignited unless the temperature of the water at said sensing point reaches a third and still higher predetermined temperature within a third period of time; igniting another burner stage after the expiration of said third time period unless the water at said sensing point has reached said third predetermined temperature within said third time period; igniting additional burner stages with a time delay after the ignition of each preceding burner stage unless the water at said sensing point reaches said third predetermined temperature until all the burner stages are ignited; and cutting off all the ignited burner stages at any time the water at said sensing point reaches said third predetermined temperature.

13. In a circulating water heater, a heat exchanger through which flows water to be heated; a plurality of combustion burners for passing products of combustion in heating relation with said heat exchanger; means dividing said combustion burners into a plurality of stages spaced lengthwise of the heat exchanger so as to supply heat to the same circulating water in succession; a first thermostat responsive to the water temperature at the outlet of the heat exchanger; a second thermostat responsive to the water temperature at the downstream edge of the first stage of said burners adjacent to the inlet to said heat exchanger; a first valve for supplying combustion fuel to said first burner stage; said thermostats being serially connected to control said valve to effect opening thereof when said thermostats are both unsatisfied and closing thereof when either thermostat is satisfied; time delay valves controlling the supply of fuel to the other burner stages; and means for initiating the time delay of the valve controlling the supply of fuel to the burner stage next downstream of said first burner stage upon the opening of said first valve whereby said next burner stage ignites a predetermined time interval after the ignition of the first burner stage unless one of the thermostats is satisfied within said predetermined time interval.

14. In a circulating water heater, a heat exchanger through which flows water to be heated; a plurality of combustion burners for passing products of combustion in heating relation with said heat exchanger; means dividing said combustion burners into a plurality of stages spaced lengthwise of the heat exchanger so as to supply heat to the same circulating water in succession; a first thermostat responsive to the water temperature at the outlet of the heat exchanger; a second thermostat responsive to the water temperature at the downstream edge of the first stage of said burners adjacent to the inlet to said heat exchanger; a first valve for supplying combustion fuel to said first burner stage; said thermostats being serially connected to control said valve to effect opening thereof when said thermostats are both unsatisfied and closing thereof when either thermostat is satisfied; time relay valves controlling the supply of fuel to the other burner stages; means for initiating the time delay of the valve controlling the supply of fuel to the burner stage next downstream of said first burner stage upon the opening of said first valve whereby said next burner stage ignites a predetermined time interval after the ignition of the first burner stage unless one of the thermostats is satisfied within said predetermined time interval; means for initiating the delay period for the time delay valve controlling each succeeding burner stage as the valve for the preceding stage opens so that the successive burner stages are ignited with predetermined time delays therebetween; and means for cutting off all ignited burner stages upon the satisfaction of either of the thermostats.

15. In a circulating water heater, a heat exchanger through which flows water to be heated; a plurality of combustion burners for passing products of combustion in heating relation with said heat exchanger; means dividing said combustion burners into a plurality of stages spaced lengthwise of the heat exchanger so as to supply heat to the same circulating water in succession; a first thermostat responsive to the water temperature at the outlet of the heat exchanger; a second thermostat responsive to the water temperature at the downstream edge of the first stage of said burners adjacent to the inlet to said heat exchanger; a valve for supplying combustion fuel to said first burner stage, said thermostats being serially connected to control said valve to effect opening thereof when said thermostats are both unsatisfied and closing thereof when either thermostat is satisfied; means for supplying fuel to the next succeeding burner stage a predetermined time interval after the ignition of the first burner stage if neither of the thermostats has been satisfied within said predetermined time interval; and means for supplying fuel to each succeeding burner stage a predetermined time interval after the ignition of the preceding burner stage or until one of the thermostats is satisfied.

16. In a circulating water heater, a heat exchanger through which flows water to be heated; a plurality of combustion burners for passing products of combustion in heating relation with said heat exchanger; means dividing said combustion burners into a plurality of stages spaced lengthwise of the heat exchanger so as to supply heat to the same circulating water in succession; a first thermostat responsive to the water temperature at the outlet of the heat exchanger; a second thermostat responsive to the water temperature at the downstream edge of the first stage of said combustion burners adjacent to the inlet to said heat exchanger; a valve for supplying combustion fuel to said first burner stage, said thermostats being serially connected to control said valve to effect opening thereof when said thermostats are both unsatisfied and closing thereof when either thermostat is satisfied; means supplying fuel to the next succeeding burner stage if said second thermostat is not satisfied a predetermined time interval after ignition of the first burner stage; means for supplying fuel to the third burner stage a predetermined time interval after ignition of said second burner stage if said first thermostat has not been satisfied within said second predetermined time interval; and means for cutting off all ignited burner stages at any time either of the thermostats is satisfied.

17. In a circulating water heater, a heat exchanger through which flows water to be heated; a plurality of combustion burners for passing products of combustion in heating relation with said heat exchanger; means dividing said combustion burners into a plurality of stages spaced lengthwise of the heat exchanger so as to supply heat to the same circulating water in succession; a thermostat responsive to the temperature of the water adjacent to the outlet of said heat exchanger; a first valve controlling the supply of fuel to the first burner stage adjacent to the outlet of the heat exchanger, said first valve being responsive to an unsatisfied condition of said thermostat for supplying fuel to said first burner stage; a second valve controlling the supply of fuel to a second burner stage; and means for effecting opening of said second valve a predetermined time interval after the opening of said first valve if said thermostat has not been satisfied within said predetermined time interval.

18. In a circulating water heater, a heat exchanger through which flows water to be heated; a plurality of combustion burners for passing products of combustion in heating relation with said heat exchanger; means dividing said combustion burners into a plurality of stages spaced lengthwise of the heat exchanger so as to supply heat to the same circulating water in succession; thermostatic means responsive to the temperature of the water adjacent to the outlet of said heat exchanger; an individual valve controlling the supply of fuel to each burner stage; means for opening the valve to the first burner stage adjacent to the heat exchanger outlet when said thermostatic means is unsatisfied; means for opening the valves to the succeeding burner stages in succession, with each valve opening a predetermined time interval after the opening of the valve to the preceding burner stage; and means for closing all open valves at any time the thermostatic means becomes satisfied.

19. In a water heater, a heat exchanger through which flows water to be heated; a plurality of combustion burners for passing products of combustion in heating relation with said heat exchanger; means dividing said combustion burners into a plurality of stages spaced lengthwise of the heat exchanger; a plurality of thermostats set to be satisfied at different temperatures and responsive to the temperature of the water adjacent to the outlet of the heat exchanger; individual valves controlling the flow of fuel to the individual burner stages; means responsive to an unsatisfied condition of all the thermostats for opening the valve to the first burner stage adjacent to the heat exchanger outlet; and means for opening the valve to the second burner stage if the lowest temperature thermostat has not been satisfied a predetermined time interval after the valve to the first burner stage opened and at the same time by-passing said lowest temperature thermostat to place the control of the valves in the next higher temperature thermostat.

20. In a water heater, a heat exchanger through which flows water to be heated; a plurality of combustion burners for passing products of combustion in heating relation with said heat exchanger; means dividing said combustion burners into a plurality of stages spaced lengthwise of the heat exchanger; a plurality of thermostats set to be satisfied at different temperatures and responsive to the temperature of the water adjacent to the outlet of the heat exchanger; individual valves controlling the flow of fuel to the individual burner stages; means responsive to an unsatisfied condition of all the thermostats for opening the valve to the first burner stage adjacent to the heat exchanger outlet; means for opening the valve to the second burner stage if the lowest temperature thermostat has not been satisfied a predetermined time interval after the valve to the first burner stage is opened and at the same time by-passing said lowest temperature thermostat to place control of the valves in the next higher temperature thermostat; means for opening the valves on succeeding burner stages a predetermined time interval after the opening of the valve to each preceding burner stage and transferring the thermostat control each time a burner stage is ignited to the next higher temperature thermostat until the control remains in the highest temperature responsive thermostat; and means for closing all of the valves to cut off all of the burner stages upon the satisfaction of the lowest temperature responsive thermostat remaining in the control circuit at any given time.

21. In a water heater, a heat exchanger through which water flows to be heated; a plurality of combustion burners for passing products of combustion in heating relation with said heat exchanger; means dividing said combustion burners into a plurality of stages spaced lengthwise of the heat exchanger; a plurality of serially connected thermostats set to be satisfied at different temperatures and responsive to the temperature of the water adjacent to the outlet of the heat exchanger; individual valves controlling the flow of fuel to the individual burner stages; means responsive to an unsatisfied condition of all the thermostats for opening the valve to the first burner stage adjacent to the heat exchanger outlet; means by-passing the lowest temperature responsive thermostat after a predetermined time interval after the valve controlling the first burner stage opened unless said lowest temperature thermostat is satisfied within said predetermined interval; and means for opening the valve controlling a second burner stage a predetermined time interval after the by-passing of said lowest temperature responsive thermostat.

22. In a water heater, a heat exchanger through which flows water to be heated; a plurality of combustion burners for passing products of combustion in heating relation with said heat exchanger; means dividing said combustion burners into a plurality of stages spaced lengthwise of the heat exchanger; a plurality of serially connected thermostats set to be satisfied at different temperatures and responsive to the temperature of the water adjacent to the outlet of the heat exchanger; individual valves controlling the flow of fuel to the individual burner stages; means responsive to an unsatisfied condition of all the thermostats for opening the valve to the first burner stage adjacent to the heat exchanger outlet; means for successively by-passing the lower temperature responsive thermostats with a time delay between each by-passing operation until the temperature control is placed in the highest temperature control thermostat; and means for opening the valve supplying fuel to a second burner stage a predetermined time interval after the temperature control is placed in the highest temperature responsive thermostat.

References Cited by the Examiner
UNITED STATES PATENTS

| | | | |
|---|---|---|---|
| Re. 21,569 | 9/40 | Crago | 236—1 |
| 1,237,403 | 8/17 | Stack | 236—33 |
| 1,421,692 | 7/22 | Hutchins | 236—33 |
| 1,961,732 | 6/34 | Bastian | 137—114 |
| 2,032,447 | 3/36 | Stack | 236—20 |
| 2,286,296 | 6/42 | McGrath | 236—68 |
| 2,339,618 | 1/44 | Crago | 236—9 |
| 2,402,177 | 6/46 | Miller | 236—1 |
| 2,626,105 | 1/53 | Beck | 236—9 |
| 2,700,505 | 1/55 | Jackson | 236—9 |
| 3,010,468 | 11/61 | Acomb | 137—114 |
| 3,138,194 | 6/64 | Jackson et al. | 236—1 |

EDWARD J. MICHAEL, *Primary Examiner.*